United States Patent [19]

Presby

[11] Patent Number: 5,256,851
[45] Date of Patent: Oct. 26, 1993

[54] MICROLENSES FOR COUPLING OPTICAL FIBERS TO ELLIPTICAL LIGHT BEAMS

[75] Inventor: Herman M. Presby, Highland Park, N.J.

[73] Assignee: AT&T Bell laboratories, Murray Hill, N.J.

[21] Appl. No.: 843,481

[22] Filed: Feb. 28, 1992

[51] Int. Cl.[5] .............................................. B23K 26/00
[52] U.S. Cl. ........................... 219/121.69; 219/121.66; 385/33
[58] Field of Search ...................... 219/121.66, 121.65, 219/121.68, 121.69, 121.75; 385/33

[56] References Cited

U.S. PATENT DOCUMENTS

| | | | |
|---|---|---|---|
| 4,710,605 | 12/1987 | Presby | 219/121 LJ |
| 4,932,989 | 6/1990 | Presby | 65/2 |
| 5,011,254 | 4/1991 | Edwards et al. | 350/96.18 |
| 5,053,171 | 10/1991 | Portney et al. | 219/121.69 |
| 5,061,342 | 10/1991 | Jones | 219/121.69 |

OTHER PUBLICATIONS

M. Saruwatari, et al., Efficient Laser Diode to Single-Mode Fiber Coupling Using a Combination of Two Lenses . . . , IEEE Jrn. of Quantum Electronics, vol. QE17, No. 6, Jun. 1981 pp. 1021-1027.
V. S. Shah, et al., Efficient Power Coupling from a 980-nm, Broad-Area Laser to a Single-Mode Fiber Using a Wedge-Shaped . . . , Jrnl. Lightwave Technology, vol. 8, No. 9, Sep. 1990, pp. 1313-1318.

Primary Examiner—Rodney B. Bovernick
Assistant Examiner—Stephen W. Barns
Attorney, Agent, or Firm—Oleg E. Alber

[57] ABSTRACT

An asymmetric hyperbolic microlens on the end of a single-mode optical fiber enhances the fiber's coupling to elliptical laser beams. The lenses, with controlled eccentricity ratios, are made by micromachining the end of the fiber with a pulsed $CO_2$ laser as the fiber is directed, preferably by computer control, about the focused laser beam. Coupling efficiencies of 90 percent (−0.75 dB) have been realized with single transverse mode lasers at a wavelength of 0.98 μm having approximately 3 to 1 beam ellipicity. With multimode lasers at 1.48 μm having similar elliptical beams, the asymmetric lenses demonstrate an almost 2 dB increase in coupling efficiency over symmetric hyperbolic microlenses. Such lasers are useful to pump erbium-doped fiber amplifiers. About 120 mw was coupled from such a laser into single-mode fiber.

16 Claims, 5 Drawing Sheets

MICROLENSES FOR COUPLING OPTICAL FIBERS TO ELLIPTICAL LIGHT BEAMS

TECHNICAL FIELD

The present invention relates to coupling optical fibers to elliptical light beams by means of microlenses fabricated on an end portion of the optical fiber.

BACKGROUND OF THE INVENTION

Symmetric microlenses have been fabricated by means of a pulsed laser beam which, when focused at an end portion of a fiber, ablates progressively the circumferential periphery of the fiber lens. See U.S. Pat. No. 4,932,989, issued to H. M. Presby on Jun. 12, 1990, which is incorporated herein by reference. The teachings of Presby have been utilized in U.S. Pat. No. 5,011,254 issued to C. A. Edwards and H. M. Presby, which is incorporated herein by reference, in order to produce hyperbolically-shaped microlensed fibers. Greater than 90 percent coupling efficiencies have been achieved for coupling light from light sources, such as semiconductor lasers with symmetric modal outputs, to single-mode fibers and from the single-mode fibers to detectors by means of hyperbolically-shaped microlensed fibers fabricated using the teachings disclosed in C. A. Edwards and H. M. Presby.

Such microlenses afford relatively high coupling efficiency; however, this is useful only for lasers having a symmetric modal output. In such lasers the output beam profiles are circular or have ellipticity ratios close to 1:1, that is, the divergence of the output beam of the laser is substantially the same along an axis parallel and an axis perpendicular to the junction plane of the laser. However, many lasers have a highly elliptical beam shape emanating from the laser facet. For instance, in the use of erbium-doped fiber amplifiers which are pumped at a wavelength of 0.98 $\mu$m, currently available pump laser diodes exhibit strong modal asymmetries, typically from 2.5:1 and up. There are also many high-power laser structures which are used to pump erbium-doped amplifiers at a wavelength of 1.48 $\mu$m with non-circular outputs whose coupling could similarly be enhanced.

The use of symmetric microlenses utilized for coupling such lasers to fibers leads to a significant decrease in the coupling efficiencies. Such decrease is exemplified in FIG. 1 in which is plotted the coupling loss (in dB) versus the ratio of the x and y mode sizes. This plot arises by considering the coupling between an incident Gaussian laser beam, having different beam divergence angles parallel and perpendicular to the junction plane, with the circular mode of a single-mode fiber. It is seen from this plot that a beam asymmetry of, for example, 3:1 carries with it a loss penalty of more than 2 dB in coupling to the fiber.

Useful pump power coupled into a single-mode fiber is generally severely limited due to the difficulty of providing efficient coupling between the laser with a highly elliptical beam shape and the fiber. While hyperbolically shaped microlenses of Edwards and Presby, supra, may eliminate or at least reduce losses due to other factors, such as beam truncation and spherical aberration, an approximately 2 dB coupling loss still remains for elliptical beams having an eccentricity of about 3:1. Maximum coupling efficiencies that have been realized between such elliptical laser beams and the fibers using symmetric microlenses are only about 50 percent, with 25 to 35 percent being more typical. This means that, since about one-half of the laser output is not utilized, the laser has to be run at higher currents to yield the same coupled power into fiber that a more efficient coupling scheme could give. Running the laser at higher currents results in greater heat to be dissipated and raises questions of long term stability and reliability of the laser itself.

Attempts to increase coupling to elliptical beams with non-symmetric lenses have been reported in the form of externally mounted cylindrical lenses and a wedge-shaped fiber endface. See M. Saruwatari et al. "Semiconductor Laser to Single-Mode Fiber Coupler", *Applied Optics*, Vol. 18, No. 11, 1979, pages 1847–1856, and V. S. Shah et al. "Efficient Power Coupling from a 980 nm, Broad Area Laser to a Single-Mode Fiber Using a Wedge-Shaped Fiber Endface", *J. Lightwave Technology*, Vol. 8, No. 9, 1990, pages 1313–1318. In the latter case the wedge-shape approximates a cylindrical lens and a coupling efficiency of 47 percent was obtained.

Clearly, what is required for optimum coupling is an asymmetrical microlens which would transform the elliptical laser output to match mode profile of the circular single-mode fiber. Therefore, it is desirable to be able to fabricate asymmetric microlenses in an efficient and a controllably reproducible manner.

SUMMARY OF THE INVENTION

The invention embodies a method and apparatus for fabricating asymmetric microlenses on optical fibers. An end portion of an optical fiber which is rotated about its longitudinal axis, is subjected to the ablating and heating action of a pulsed laser beam. The pulsed laser beam preferentially ablates the circumferential periphery along one of two orthogonal axes perpendicular to the longitudinal axis of the fiber, resulting in an asymmetric microlens having an elliptical cross-section. Coupling efficiencies of the order of 90 percent have been obtained with this procedure.

The asymmetric microlens is formed at an end of an optical fiber by inducing both ablation of the surface and heating of the underlying material by means of a laser beam preferentially along and at opposite ends of one of the two orthogonal axes which are perpendicular to the longitudinal axis. The radius of curvature of the microlens is determined by moving the fiber in predetermined movement sequences perpendicularly to the beam.

DETAILED DESCRIPTION

In order to realize high elliptical-light-beam to fiber coupling efficiency, such as between a laser having an elliptical mode and a fiber with a circular mode, the elliptical mode of the laser diode must match that of the circular single mode fiber. By fabricating an asymmetric microlens directly on the end of a single-mode fiber, high coupling efficiencies can be achieved to devices, such as lasers, photodetectors, modulators, etc., having asymmetric modal characteristics. By matching the elliptical mode of the device to the circular mode of the single mode fiber in accordance with the present invention, coupling efficiency may be increased considerably. For example, more than 90 percent of the light from the elliptically shaped beam of 0.98 μm lasers may be coupled into a single mode fiber. Increase in the coupling efficiency of the fiber to multimode 1.48 μm lasers with elliptical beams by more than 2 dB is also possible with the same lens forming method. These results are about a factor of two better than other reported coupling values.

In accordance with the principles of the invention, asymmetrical microlenses are fabricated with an arrangement similar to that which was used for the formation of symmetric lenses. For example, see U.S. Pat. No. 4,932,989 or U.S. Pat. No. 5,011,254, both supra. The fiber to be microlensed is rotated in a precision capillary tube, held by an xyz micromanipulator, which is moved in small increments across the diffraction-limited focused beam of a pulsed $CO_2$ laser. The end portion of an optical fiber, which is rotated about its longitudinal axis, is subjected to the action of a pulsed laser beam such that an asymmetric microlens is formed thereon. The pulsed laser beam preferentially ablates the circumferential periphery along and at opposite ends of one of the orthogonal axes of the fiber, resulting in an elliptical cross-section of the remaining portion of the fiber along the other of the orthogonal axes. Importantly, in order to effectuate asymmetric ablation, a pulsed laser beam engages the fiber perpendicularly to the longitudinal axis of the fiber with the pulse duration along the circumferential angular position (0° and 180°) selected according to the radius of curvature and eccentricity desired, respectively. The pulses selected should be of sufficient intensity for causing ablation and yet of sufficiently short duration to produce by heating a desired radius of curvature on the end portion of the fiber.

Figure 3:
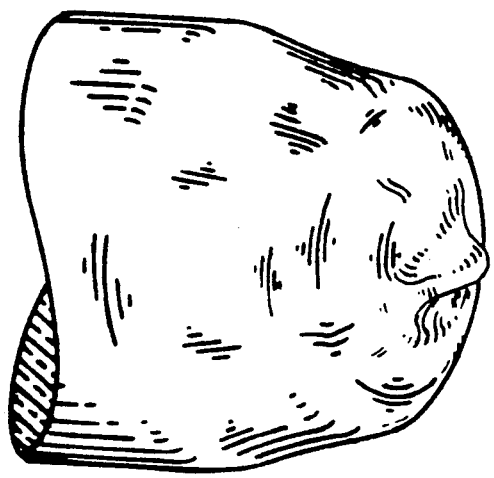
FIG. 3 is a schematic representation of an asymmetric microlens formed in accordance with the principles of the invention from the lens shown in FIG. 2.
Figure 5:
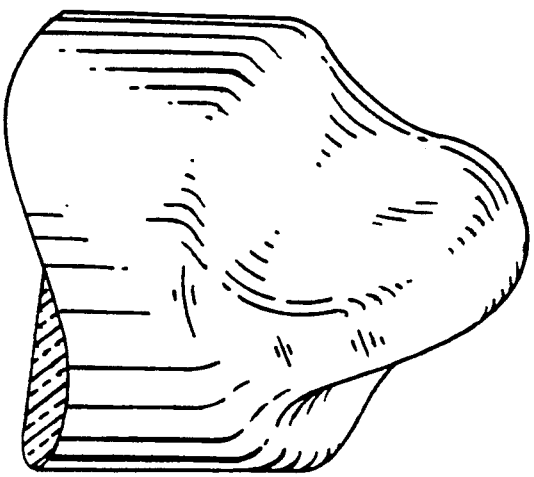
FIG. 5 is a schematic representation of an asymmetrical hyperbolic microlens produced in accordance with the present invention at the end portion of the optical fiber shown in FIG. 4.

By ablating substantially along the 0 and 180 degree rotational positions, the microlens exhibits an elliptical cross sectional area as illustrated in FIGS. 3 and 5. The desired eccentricity may be determined empirically by measuring the light distribution produced by the lens and then varying the degree of exposure of the lens to the pulsed beam along the tangential plane. The eccentricity of the cross-sectional area formed by the preferential ablation along one orthogonal axis, such as the major axis of the ellipse, determines the eccentricity of the microlens formed on the end of the fiber. This is because the simultaneous induction of ablation and heating on the end of the fiber both cuts and melts the core and endface of the fiber along the z-axis in proportion to the cross-sectional area defined.

Figure 2:
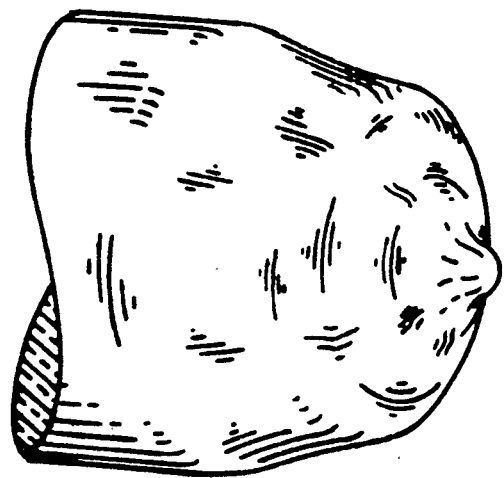
FIG. 2 is a schematic representation of a hyperbolic microlens at an end of an optical fiber.

In one exemplary embodiment, the fiber is first subjected to the formation of a symmetric microlens at the end of the fiber as is shown in FIG. 2. Once the symmetric microlens has been formed, the rotation of the fiber is stopped and, simultaneously, the laser beam is deactivated. The fiber is positioned and progressively moved relative to the beam such that, after the laser beam is reactivated, the fiber is exposed progressively to the cross-sectional edge of the pulsed laser beam to ablate the surface of the symmetric microlens along one tangential plane. Thereafter, the fiber is rotated to a position precisely 180° from the first ablating position and the opposite tangential plane is then similarly micromachined, resulting in an asymmetric microlens having an eccentricity between the radii of curvature in the sagittal and tangential planes, see FIG. 3. The degree of exposure to the cross-sectional edge of the pulsed laser is selected to attain the desired lens eccentricity, that is, its asymmetry. While the lens is clearly displaying the asymmetric shape, each of the surface contours of the lens is hyperbolic in shape.

Figure 4:
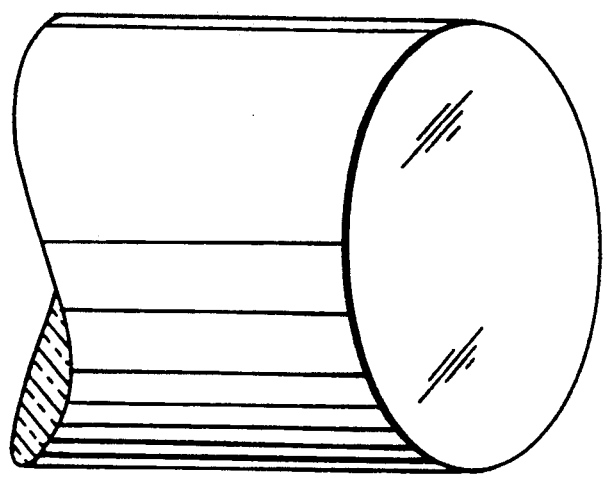
FIG. 4 is a schematic representation of an end portion of an optical fiber prior to the formation of a microlens thereon.

In another exemplary embodiment schematically represented in FIGS. 4 and 5, the asymmetric microlens is fabricated on the fiber directly when the fiber is rotating about its longitudinal axis. In order to realize the desired elliptical cross-sectional area, that is, the eccentricity of the microlens, the pulsed laser beam is activated during each revolution at 180° intervals, such as at the 0° and 180° rotational positions of the fiber. With the fiber positioned and progressively moved relative to the cross-sectional edge of the laser beam, the desired asymmetry is then achieved by micro-machining an elliptical cross-sectional area, as is shown in FIG. 5.

Figure 6:
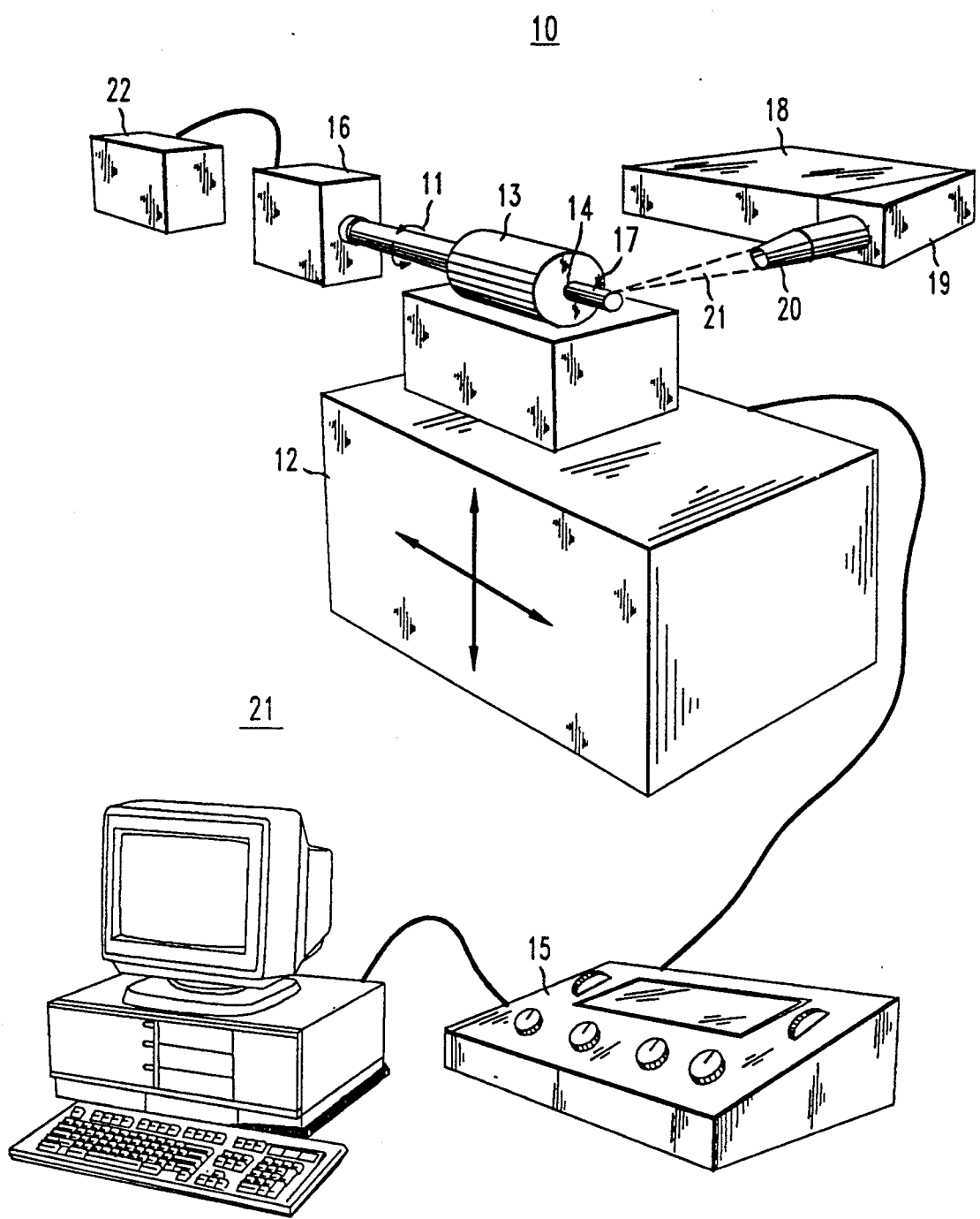
FIG. 6 is a schematic representation of a laser micromachining apparatus for producing an asymmetric microlens on the end of an optical fiber.

FIG. 6 shows an exemplary embodiment of an apparatus 10 for fabricating an asymmetric microlens at the end of a single-mode optical fiber 11 in accordance with the principles of the invention. Except for the use of a rotation sensor and xyz translator, the apparatus is similar to that described in U.S. Pat. Nos. 4,932,989 and 5,011,254, which are incorporated herein by reference.

Apparatus 10, includes a precision xyz translator 12 for stepping fiber, 11, in three dimensions in preselected increments, such as of 0.1 μm. Fiber 11 is secured to translator 12 by fiber holder, 13. Upon inserting fiber 11 into through-aperture, 14, formed longitudinally of fiber holder 13 and having a circular cross-section, translator 12 enables fiber 11 to be moved horizontally, vertically, or in any vectorial combination thereof. Translator 12 may be controlled manually, by a translator controller, 15, or programmably via computer, 21.

Rotation of fiber 11 about its longitudinal axis at a rotation speed ranging from 10 to 1000 rpm is provided by mounting the fiber in a suitable spinning device schematically shown as block 16. Such spinning devices are well known in the art, such as a microlathe driven chuck and the like. Free end portion or end facet 17 of optical fiber 11 passes through aperture 14 so that a relatively short end portion of the fiber projects from the fiber holder. The length of the fiber projecting from the holder should be long enough to permit formation of a microlens at the end of fiber 11 but short enough to avoid eccentricity in rotation during ablation by a pulsed laser, 18. An appropriate length ranges from about 1 mm to a few mm. To avoid twisting of fiber 11 during rotation, the diameter of through-aperture 14 should be selected such that free rotation is realized between the fiber and inner walls of through-aperture 14 without undue friction therebetween. Typically, the inner diameter of through-aperture 14 may be up to 2 μm greater than diameter of fiber 15, resulting in a rotation accuracy to within 1 μm of the fiber axis.

Laser 18, which is arranged in a spatial relationship to fiber 11, is used for micromachining an asymmetric microlens on free end portion 17 of fiber 11. Laser 18 is provided with suitable optical means 19 and 20 for focusing laser beam 21 onto free end 17 of fiber 11. Preferably, the fiber is engaged by the laser beam perpendicularly to the longitudinal axis of the fiber. The fine positioning of laser beam 21 on the free end 17 of fiber 11 is accomplished by moving fiber 11 via translator 12 relative to the beam. Rotation sensor, schematically shown as block 22, monitors the rotational position of fiber 11.

Rotation sensor may take many versions as is well-known in the art. Among these is a sensor including a microswitch connected to a laser control. The microswitch is activated at spaced intervals, e.g. at 0° and 180° positions, during the revolution of a spindle of the spinning device, and deactivated at intermediate positions. The ratio of the activated period to the deactivated period determines the ellipticity of the lens. Another version includes a disc with clear and opaque sectors, which is attached to the spindle of the device, and a light source and a photocell which are arranged such that a light beam from the light source is interrupted by the opaque sectors of the disc. The signal from the photocell controls a pulse generator to turn the laser beam on and off. The ratio of clear to opaque sectors in the disc determines the ellipticity of the lens.

Micromachining of the microlens is realized in this exemplary embodiment using a sealed-cavity, RF waveguide $CO_2$ laser 18 emitting approximately 25 watts. Other types of lasers, such as excimer lasers emitting in the ultraviolet regime, may be used. Laser 18 is driven with an external power supply (not shown) that generates RF excitations linked in a known manner to the laser, enabling the laser output to be pulsed under external control with pulse times as short as 10 μsec. The laser output, which operates at 10.6 μm, egresses through a 4× beam expander and is deflected at 90 degrees so that it propagates through focusing lens 20, such as a 7.6 cm focal length zinc selenide lens. It is anticipated that the focussed spot radius is approximately 15 μm in diameter, with the greatest energy density within a 5 μm diameter. At the center of the focused spot, the power density has been calculated to be approximately $7.1 \times 10^{-2} W/\mu m^2$. The pulsed laser beam is used to flash evaporate portions of the periphery of optical fiber 15 in accordance with the teaching disclosed in U.S. Pat. No. 4,710,605, issued to H. M. Presby on Dec. 1, 1987, which is incorporated herein by reference. Specifically, the cross-section of the laser beam engages an outer periphery of the fiber in a direction perpendicular to the longitudinal axis of the fiber, with the intensity and duration of pulses selected in order to progressively ablate and remove the material of the fiber without redeposition such that an asymmetric microlens is formed at the end of fiber.

Knowing the desired eccentricity of the lens, the fiber positioning relative to the laser beam and the pulse duration can be adjusted so as to remove material from the fiber to form the desired ellipse. For example, for an arbitrary 0° and 180° position, as determined by rotation sensor 22, the pulse duration is accordingly adjusted to leave along one of the orthogonal axes an amount 2a from the center core of fiber 11, whereas for a 90° and 270° position, relative to the 0° position, the pulse duration is adjusted such that along the other of the orthogonal axes an amount 2b of fiber 11 is left from the center of the core. It should be noted that along the x-axis the defined ellipse has a length 2a while along the y-axis the length is 2b with a being one-half the distance from the center to the outer surface of the ellipse along said one (x) orthogonal axis and b being one-half the distance along the other (y) orthogonal axis. For intermediate values of angular positions, the pulse duration is adjusted to leave a lens shape of the desired ellipticity. As such, rotation sensor 22 continuously monitors the angular position of the fiber that is exposed to the pulsed laser beam such that a proper amount of material may be ablated. The defined elliptical cross-sectional area determines the eccentricity of the microlens formed on the end thereof.

Comparisons of coupling efficiencies of laser-micromachined asymmetric microlens with symmetric microlens show significantly better coupling efficiencies for the asymmetric microlens. This effect is due largely to more properly matching the modal eccentricity of the laser beam with the eccentricity of the radius of curvature of the microlens formed. It is observed that asymmetric microlenses, which have been properly matched to the modal asymmetry of the injected laser light, exhibit up to 2 dB greater coupling efficiency, relative to symmetric, e.g. hyperbolically shaped microlenses.

Figure 1:
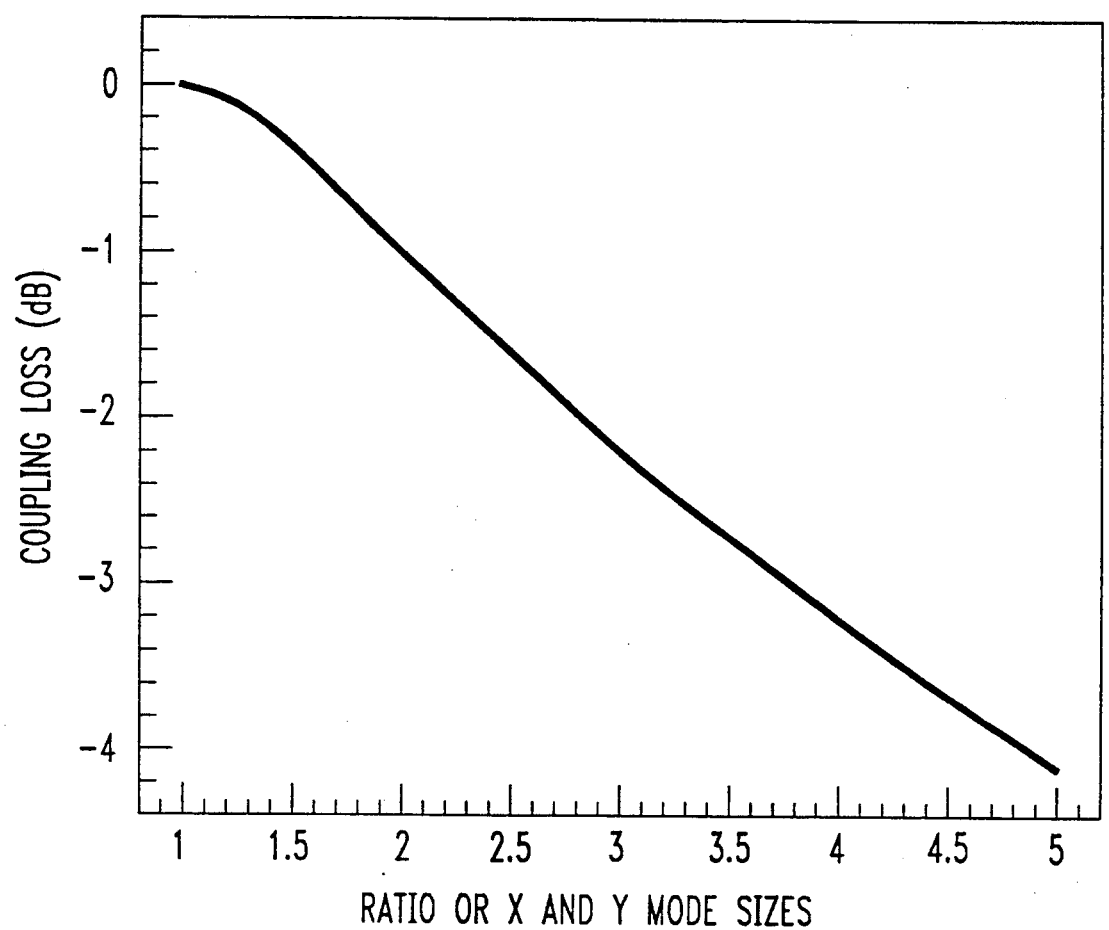
FIG. 1 is a plot of coupling loss (in dB) versus the ratio of x and y mode sizes, for coupling between a laser beam and a circular mode of a single mode fiber.
Figure 7:
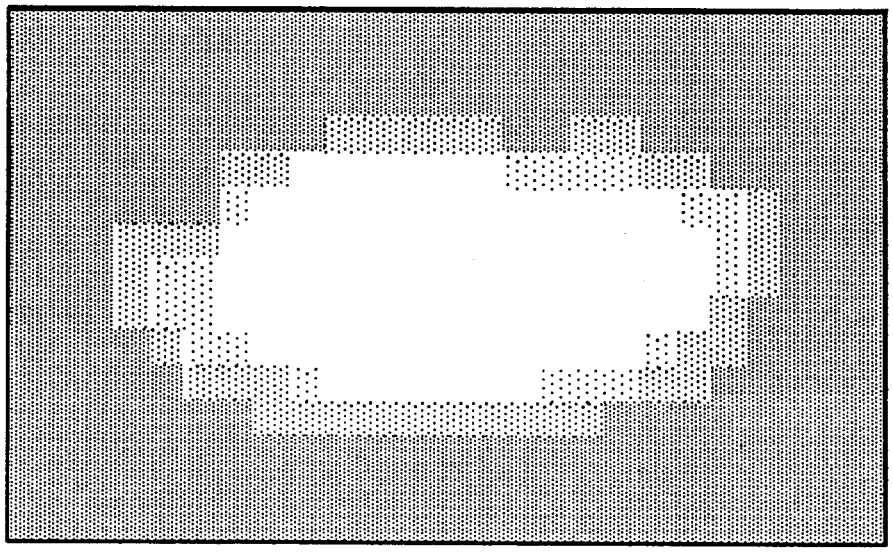
FIG. 7 is a schematic representation of a near field output of a 0.98 μm laser with beam ellipticity near 3:1.

Shown in FIG. 7 is a schematic representation of the near-field output of the 0.98 μm laser diode being used in these coupling experiments. It has an elliptically shaped beam with an aspect ratio of 2.7 to 1. The 1/e mode size is 2.6 μm by 0.96 μm. It is seen from the plot shown in FIG. 1 that for this ellipticity an approximately 2 dB coupling loss should result with symmetric microlenses from this asymmetry alone.

Figure 8:
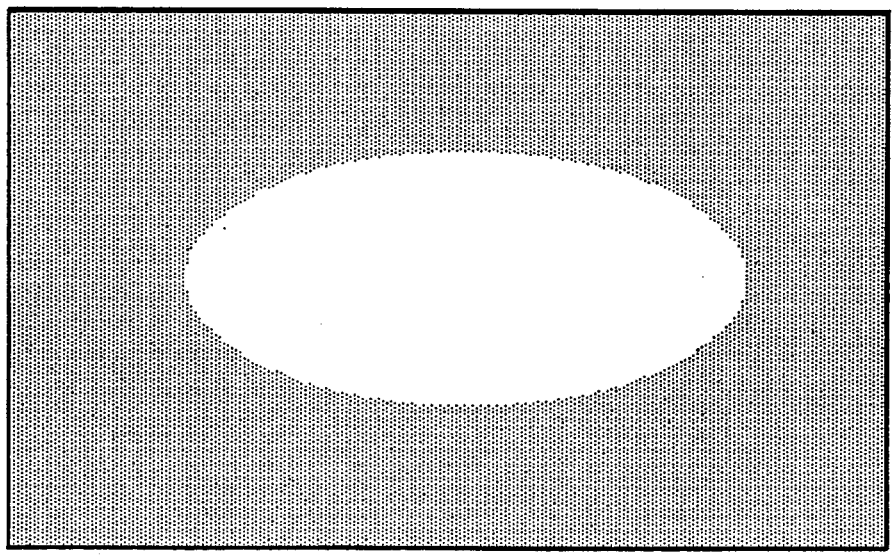
FIG. 8 is a schematic representation of a near field output of an asymmetrical hyperbolic microlens with ellipticity near 3:1.

A schematic representation of the near field output of a lens which was fabricated on standard fiber designed for use at operating wavelengths of 1.3 and 1.5 μm, is shown in FIG. 8. The ellipticity of the beam is about 2.7 to 1 providing an excellent match to the output of the 0.98 μm laser. A coupling efficiency of 84.3 percent (−0.74 dB) was measured with this lens. Lenses fabricated on fiber with a 1.06 μm wavelength cutoff to guarantee that all of the collected power was in the useful fundamental mode, led to coupling efficiencies of 78.4 percent (−1.06 dB).

The power output of the laser was measured by collecting all of its output with a high-index ball-lens positioned very close to the laser in order to provide a collimated beam. A maximum power of 120 mw was measured into the dominate mode of a single mode fiber with the asymmetric lens. The measured power versus current values were almost identical to those measured independently by the laser manufacturer. The appropriate axis of the lens was oriented to that of the laser by launching a He-Ne laser beam into the end of the ~1 m long pigtail opposite the lens, observing the projection and rotating the lens. This rotational alignment was not very critical to optimum coupling.

The ellipticity of the output beams of lenses fabricated to couple to high power 1.48 μm laser diodes were similar to those for the 0.98 μm laser diodes, being in the range of 3:1. The output of these lasers, however, was not single-mode as was the 0.98 μm laser. While the mode structure does not allow for the same high absolute coupling efficiency as with a single-mode, an approximately 2 dB increase was measured in the power coupled from 1.48 μm laser to asymmetric hyperbolic microlenses, relative to the symmetric variety.

These coupling values were obtained without any anti-reflection coatings on the lenses. Such coatings could increase the coupling by several tenths of a dB thus capturing nearly all of the available laser light.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

I claim:

1. A process for fabricating an optical fiber microlens for coupling an optical power between an optical device having an asymmetric output light distribution and an optical fiber, the ellipticity ratio of the asymmetric modal area of the device being greater than 1.5:1.0, which comprises:

laser micromachining an end portion of an optical fiber by ablating and heating the material of the end portion of the optical fiber by means of a laser beam, in which said micromachining is conducted by removing a greater proportion of the material at opposite ends of one orthogonal axis of the optical fiber than at opposite ends of the other orthogonal axis, such as to produce a microlens having a given ellipticity ratio.

2. The process of claim 1, in which the ellipticity ratio of the modal area of the device ranges between 1.5:1 and 10:1.

3. The process of claim 1, in which first a symmetric microlens is produced at the end of the optical fiber, and then segments of the lens along the opposite ends of one orthogonal axis of the lens are ablated to introduce asymmetry to the lens.

4. The process of claim 3, in which first a desired segment of the cross-section of the microlens at one end of said one orthogonal axis is removed, followed by the removal of a matching segment at an opposite end of said one orthogonal axis.

5. The process of claim 1, in which said asymmetry is introduced by ablating the fiber sequentially at opposite ends of one orthogonal axis of the optical fiber during the rotation of the fiber about its longitudinal axis, until a desired segment of the cross-section of the fiber is removed at said opposite ends of said one orthogonal axis.

6. The process of claim 5, in which the laser beam is intermittently activated at intervals corresponding to 180° positions of the fiber, so as to remove the segments along and adjacent to the opposite ends of said one orthogonal axis.

7. The process of claim 1 in which a symmetric microlens is partially formed on the end of the fiber, and then the laser beam is intermittently activated at intervals corresponding to 180° positions of the fiber so as to remove segments of the fiber along and adjacent to opposite ends of one orthogonal axis of the fiber.

8. The process of claim 1 in which said laser micromachining is conducted by means of a pulsating laser beam.

9. The process of claim 1 in which the operating wavelength, λ, of the optical power being coupled is within a range of from 0.2 to 2.5 μm.

10. The process of claim 1, in which the operating wavelength, λ, of an optical power being coupled is within a range of from 0.2 to 1.6 μm.

11. The process of claim 10, in which said operating wavelength λ is about 0.98 μm.

12. The process of claim 10, in which said operating wavelength is equal to about 1.48 μm.

13. The process of claim 1, in which said microlens results in a coupling efficiency exceeding 50 percent of the optical power being coupled.

14. The process of claim 1, in which said microlens results in coupling efficiency of the order of 90 percent.

15. The process of claim 1, in which said optical device is selected from the group consisting of lasers, semiconductor amplifiers, optical fiber amplifiers, pump sources for fiber amplifiers, modulators, photodetectors and integrated circuit waveguides.

16. The process of claim 1, in which said optical device is a laser.

* * * * *